United States Patent [19]

Belart

[11] 4,397,219
[45] Aug. 9, 1983

[54] BRAKE BOOSTER FOR AUTOMOTIVE VEHICLES

[75] Inventor: Juan Belart, Walldorf, Fed. Rep. of Germany

[73] Assignee: ITT Industries, Inc., New York, N.Y.

[21] Appl. No.: 231,691

[22] Filed: Feb. 5, 1981

[30] Foreign Application Priority Data

Mar. 20, 1980 [DE] Fed. Rep. of Germany ....... 3010684

[51] Int. Cl.³ ................. F15B 9/10; F01B 19/00; F16J 3/02
[52] U.S. Cl. ................. 91/376 R; 91/369 A; 92/98 D; 92/166
[58] Field of Search ............. 91/369 A, 369 B, 369 R, 91/376 R; 92/165 PR, 166, 98 D, 99, 101, 98 R; 60/547 R, 554

[56] References Cited

U.S. PATENT DOCUMENTS

| | | | |
|---|---|---|---|
| 3,040,535 | 6/1962 | Randal | 60/554 |
| 4,270,353 | 6/1981 | Thomas et al. | 92/165 PR |
| 4,338,854 | 7/1982 | Nlargetts | 91/369 A |

FOREIGN PATENT DOCUMENTS

54-156982 12/1979 Japan .................. 91/369 A

Primary Examiner—Paul E. Maslousky
Attorney, Agent, or Firm—John T. O'Halloran; Alfred C. Hill

[57] ABSTRACT

A brake booster for automotive vehicles includes a low-pressure casing which is sealingly subdivided into a low-pressure chamber and a working chamber by an axially movable wall. The low-pressure chamber includes a casing port adjacent the low-pressure chamber and a portion of the splashboard of the automotive vehicle to which the casing part adjacent the low-pressure chamber is secured at an outer annular sealing surface of the portion of the splashboard in a sealed relationship thereto. Located at the portion of the splashboard is an inner annular sealing surface to which the end of a central reinforcement tube for the low-pressure casing adjacent the working chamber is sealingly connected.

4 Claims, 2 Drawing Figures

BRAKE BOOSTER FOR AUTOMOTIVE VEHICLES

BACKGROUND OF THE INVENTION

The present invention relates to a brake booster for automotive vehicles comprising a low-pressure casing including two casing parts which are sealingly connected to each other at the casing periphery, the low-pressure casing being sealingly subdivided into a low-pressure chamber and a working chamber by an axially movable wall, the working chamber being connectible to the low-pressure chamber or to atmosphere by a mechanically actuatable control valve, and a force-transmitting member axially penetrating the movable wall in a sealed relationship thereto.

A generally desired weight reduction of the automotive vehicles makes it necessary to design all component parts and assemblies of the automotive vehicle in a maximum possible weight-saving way. As to the brake booster, a weight reduction can be accomplished by having the transmittance of force from the master cylinder of the brake unit to that component of the automotive vehicle to which the brake booster is secured-conventionally the splashboard-no longer effected via the low-pressure casing but rather via a force-transmitting member axially penetrating the low-pressure casing, for example, tie rods, such as disclosed in German Patent DE-OS No. 2,845,794, or a central reinforcement tube such as disclosed in a copending U.S. application of J. Belart and F. Weinecke, Ser. No. 061,113, filed July 26, 1979 and assigned to the same assignee as the present application. In these arrangements, the casing parts which form the low-pressure casing only have to absorb those forces that are caused by the occurring differences in pressure. By constructing the low-pressure casing of lighter weight material, a weight reduction of the booster itself was achieved. However, it is not possible to further reduce its weight by reducing the size of the low-pressure casing, since the necessary effective surface of the movable wall in the low-pressure casing is determined by the magnitude of the partial vacuum available and by the brake boosting force required.

SUMMARY OF THE INVENTION

It is, therefore, an object of the present invention to provide a brake booster of the type referred to hereinabove in which a further weight reduction of the brake booster is attained without decreasing the effective surface of the movable wall and without a loss in stability.

A feature of the present invention is the provision of a brake booster for automotive vehicles comprising a low-pressure casing sealingly subdivided into a low-pressure chamber and a working chamber by an axially movable wall, the working chamber being connectible to one of the low-pressure chamber and atmosphere by a mechanically actuated control valve, the casing including two casing parts sealingly connected to each other at the periphery of the casing, one of the two casing parts adjacent the working chamber being a portion of a splashboard of the vehicles; and a force-transmitting member axially penetrating the movable wall in a sealed relationship therewith, one end of the member being connected to the other of the two casing parts and the other end of the member being connected in a sealed relationship with the portion of the splashboard.

This arrangement eliminates completely the need for a separate casing part on the side close to the working chamber and thus results in a considerable weight reduction of the low-pressure casing. The splashboard of the automotive vehicle is available anyway and is able to provide the function of a casing part, namely of the casing end wall on the side close to the working chamber, without necessitating costly constructive measures therefor.

Suitably, two concentric annular sealing surfaces are formed on the splashboard to facilitate the necessary sealing relative to the outer rim of the other casing part as well as the sealing of the working chamber in the central area.

In accordance with an embodiment of the present invention, there is provided an inner annular sealing surface formed in a bottom surface of a cup-like indentation of the splashboard. An outer annular sealing surface is formed by a circumferential groove, depression, a bead or the like. Thus, a centering of the remaining casing part is attained.

In accordance with another embodiment of the present invention, an outer annular sealing surface is formed at a circumferential, substantially cylindrical shoulder of the splashboard, to which shoulder the remaining casing part is radially clamped.

In the case of the movable wall being sealed relative to the low-pressure casing by means of a rolling diaphragm having an outer sealing bead, the sealing bead is able to be clamped at least partly between the outer rim of the casing part on the side close to the partial vacuum and the outer sealing surface of the splashboard and, in doing so, is at the same time able to form the seal between this casing part and the splashboard so that a separate seal can be dispensed with.

The sealing bead of the rolling diaphragm suitably embraces the outer rim of the casing part on the side close to the partial vacuum. This provides simplification of the assembly, because the outer rim of the casing part forms simultaneously a reinforcement insert for the sealing bead.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
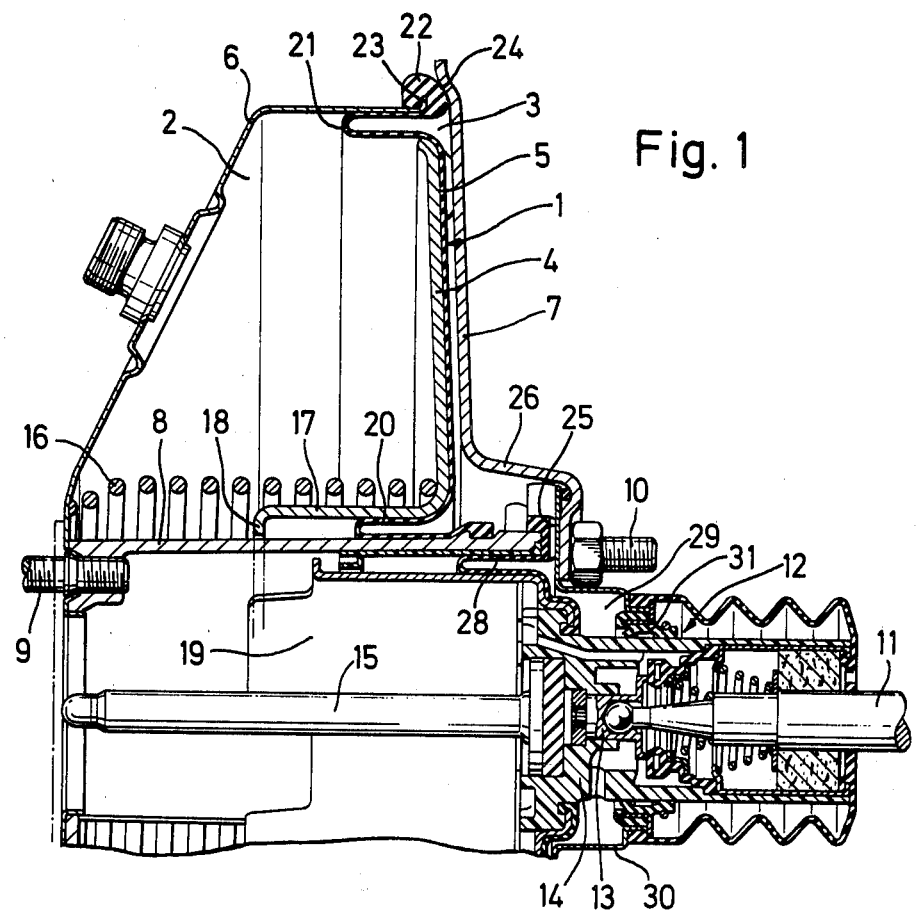
FIG. 1 is a partial longitudinal cross sectional view of a brake booster in accordance with the principles of the present invention.

The brake booster illustrated in FIG. 1 includes an axially movable wall 1 separating a low-pressure chamber 2 from a working chamber 3. Movable wall 1 includes a diaphragm plate 4 and a diaphragm 5 abutting thereon. Low-pressure chamber 2 is enclosed by movable wall 1 and a dish-shaped casing part 6 which is made from sheet metal. Working chamber 3 is disposed between diaphragm 5 of movable wall 1 and a splashboard 7 of the automotive vehicle which forms the casing part on the side close to working chamber 3.

Extending axially through the low-pressure casing is a reinforcement tube 8 having its one end fastened to casing part 6 and to a (not illustrated) master cylinder of the brake unit by means of threaded bolts 9. On its other end, reinforcement tube 8 is fastened to splashboard 7 by means of threaded bolts 10.

A control valve 12 which is actuatable by a piston rod 11 is disposed at the end of reinforcement tube 8, adjacent working chamber 3 and includes a control valve piston 13 which is connected to piston rod 11 and which opens valve openings in a control valve housing 14 in such a manner that working chamber 3 communicates with low-pressure chamber 2 in the inactive position illustrated. When control valve 13 is actuated, i.e. when piston rod 11 is axially displaced, the connection between low-pressure chamber 2 and working chamber 3 is interrupted, and working chamber 3 is connected to atmosphere so that movable wall 1 will move toward low-pressure chamber 2.

The axially movable valve housing 14 is connected with a push rod 15 which acts on an actuating piston (not illustrated) of the master cylinder. A compression spring 16 bearing against casing part 6 and against diaphragm plate 4 maintains the movable wall 1 resiliently in the illustrated initial position.

As is indicated in FIG. 1 by dot-dash lines, diaphragm plate 4 is via a substantially cylindrical hub member 17 and via radially inwardly extending ribs 18 connected with a sleeve 19 which is connected with control valve housing 14. Reinforcement tube 8 includes (not illustrated) openings for radial ribs 18 to extend therethrough. Upon an axial movement of wall 1, a boosting force will be transmitted via ribs 18, sleeve 19 and control valve housing 14 to push rod 15 and finally to the actuating piston of the master cylinder.

Diaphragm 5 abutting diaphragm plate 4 forms a rolling diaphragm 20 as a seal relative to reinforcement tube 8 in the area of hub member 17, while diaphragm 5 forms an outer rolling diaphragm 21 as a seal relative to the low-pressure casing at the periphery of diaphragm plate 4. Rolling diaphragm 21 includes an outer sealing bead 22 which encloses the outer rim 23, extending outwardly in a collar-like manner, of casing part 6 and is partly clamped sealingly between rim 23 and a circumferential sealing surface 24 of splashboard 7 to seal working chamber 3 relative to atmosphere at this location.

Another circular sealing surface 25 is formed in the bottom surface of a cup-like indentation 26 of splashboard 7. The end of reinforcement tube 8 adjacent to working chamber 3 is fastened to sealing surface 25 in a sealed relationship.

Figure 2:
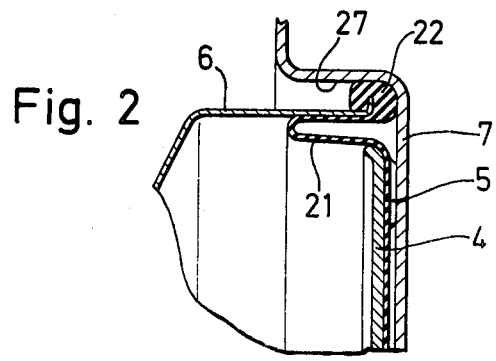
FIG. 2 is a partial longitudinal cross sectional view of another embodiment of the splashboard that may be employed in the brake booster of FIG. 1.

In the embodiment of FIG. 1, outer annular sealing surface 24 is formed by a circumferential inclination at which the rim of casing part 6 is centered. A centering which is still better and, simultaneously, a radial clamping of outer rim 23 of casing part 6 may be attained by the embodiment illustrated in FIG. 2, in which a circumferential, substantially cylindrical shoulder 27 of splashboard 7 provides outer circumferential sealing surface 24. In this arrangement, the sealing force acting in a radial direction is generated by the deformation of sealing bead 22 being urged into shoulder 27 against surface 24.

The partial vacuum effective in low-pressure chamber 2 urges rim 23 against outer sealing surface 24 making available—on top of a selected preload, if necessary, with which casing part 6 is pressed against splashboard 7—an additional sealing force, the amount of which is greater, the higher the partial vacuum in low-pressure chamber 2 is, i.e. the sealing force is greater, the higher that partial vacuum is that has to be sealed.

Secured between the end of reinforcement tube 8 adjacent working chamber 3 and sealing surface 25 is a rolling diaphragm 28 which serves as a movable seal relative to control valve housing 14. The annular chamber 29 which surrounds control valve housing 14 and communicates with working chamber 3 is sealed relative to atmosphere by a sleeve 30. Sleeve 30 is sealingly fastened to sealing surface 25 and is in sealing contact with the outer surface of control valve housing 14 through a sliding seal 31.

While I have described above the principles of my invention in connection with specific apparatus, it is to be clearly understood that this description is made only by way of example and not as a limitation to the scope of my invention as set forth in the objects thereof and in the accompanying claims.

I claim:

1. A brake booster for an automotive vehicle comprising:
    a low-pressure casing sealingly subdivided into a low-pressure chamber and a working chamber by an axially movable wall, said working chamber being connectible to one of said low-pressure chamber and atmosphere by a mechanically actuated control valve, said casing including a first casing part adjacent said low-pressure chamber having an outer rim at the periphery thereof and a second casing part adjacent said working chamber, said second casing part being a portion of a splashboard of said vehicle having an outer annular sealing surface and an inner annular sealing surface, said movable wall including a rolling diaphragm having an outer sealing bead embracing said outer rim and in a sealed relationship with said outer sealing surface to seal said first and second casing parts and said movable wall to one another; and
    a force-transmitting member axially penetrating said movable wall in a sealed relationship therewith, one end of said member being connected to said first casing part and the other end of said member being connected in a sealed relationship with said inner sealing surface.

2. A brake booster according to claim 1, wherein said inner sealing surface is provided in a bottom surface of a cup-like indentation of said portion of said splashboard.

3. A brake booster according to claims 1 or 2, wherein said outer sealing surface is provided by a circumferential inclination in said portion of said splashboard.

4. A brake booster according to claim 1 or 2, wherein said outer sealing surface is provided by a circumferential, substantially cylindrical shoulder of said portion of said splashboard.

* * * * *